United States Patent
Taylor

[15] 3,654,711
[45] Apr. 11, 1972

[54] TEACHING AID

[72] Inventor: Lowell M. Taylor, P.O. Box 224, Kaysville, Utah 84037

[22] Filed: Feb. 16, 1970

[21] Appl. No.: 11,695

[52] U.S. Cl. .................................................35/66, 35/7 A
[51] Int. Cl. ...........................................................B43l 1/04
[58] Field of Search..............35/7 A, 66; 281/29; 273/130 A, 273/131 AD; 40/142 A

[56] References Cited

UNITED STATES PATENTS

| | | | |
|---|---|---|---|
| 2,665,913 | 1/1954 | Hlavac | 273/131 AD X |
| 3,093,919 | 6/1963 | Holtz | 40/142 A |
| 3,432,944 | 3/1969 | Ishida | 35/66 |
| 3,456,373 | 7/1969 | Epton | 40/142 A X |

FOREIGN PATENTS OR APPLICATIONS

| | | | |
|---|---|---|---|
| 842,480 | 7/1960 | Great Britain | 35/7 A |
| 968,487 | 9/1964 | Great Britain | 40/142 A |

*Primary Examiner*—Harland S. Skogquist
*Attorney*—B. Deon Criddle

[57] ABSTRACT

A teaching aid usable as a chalk board and for displaying movable objects. The teaching aid includes a board having a sandwich construction comprising rigid center core, a lamination of magnetic material such as thin sheet steel or steel foil on at least one side of the center core and a covering of book cloth material on both flat faces of the board. Magnetized rubber or vinyl members are coated so that they will stick to the face of the board having the magnetic sheet therebeneath but so that they are easily slidable thereover.

2 Claims, 3 Drawing Figures

PATENTED APR 11 1972　　　　　　　　　　　3,654,711

INVENTOR:
LOWELL M. TAYLOR
BY:
B. Dean Griddle
ATTORNEY

TEACHING AID

BRIEF DESCRIPTION

There has long been a need for a low cost, lightweight teaching aid that can be used as a chalkboard or that will provide a magnetic board on which magnetic members can be readily moved.

A football coach, for example, can use such a teaching aid to mark semi-permanent fixed figures or designs on the board while at the same time using the magnetic members to show player movement. Alternatively, different shapes or colors of magnetized members can be used to represent different teams.

Teachers also have a need for such a board. Frequently it is desired to have a lightweight chalk board that can be moved from classroom to classroom or even to outdoor teaching areas. Also it is often desirable to have a board on which animated characters can be moved from area to area in simulation of actual movement.

Objects of the present invention are to provide a teaching aid usable as a lightweight chalk board or a magnetic board, and to provide magnetic members that will be held on the board but that will readily slide thereover.

SUMMARY OF THE INVENTION

Principal features of the invention include a board of sandwich construction, with a central core of stiff cardboard or other substantially rigid material, a layer of magnetic material such as thin sheet steel or steel foil and a cover for each face of the board made of book cloth material.

Other features include rubberized magnetic members for use on a face of the board and Mylar coatings on at least one face of the magnetic members to render them more easily slidable on the book cloth cover of the board.

Additional objects and features of the invention will become apparent from the following detailed description and claims, taken with the accompanying drawing.

THE DRAWING

FIG. 1 is a perspective view of a cut-out section of a board forming part of the teaching aid of the invention;

FIG. 2, a perspective view of a magnetic member forming part of the teaching aid of the invention; and FIG. 3, a perspective view of the teaching aid of the invention, showing a movable character attached to a magnetic member that is attracted to and held on a face of a board.

DETAILED DESCRIPTION

Figure 1:
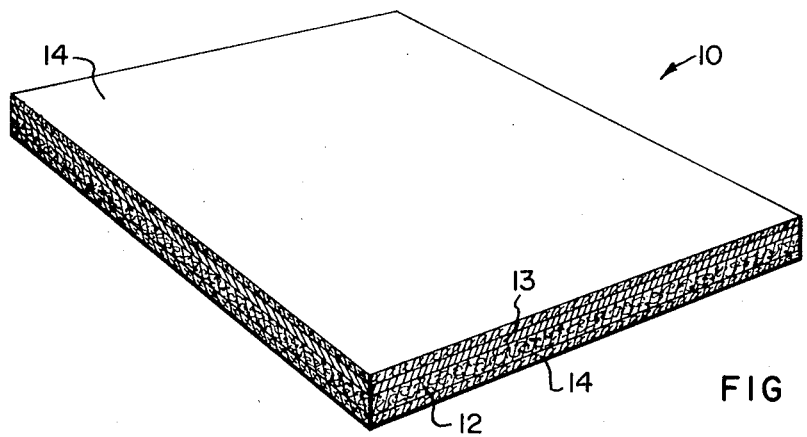
Figure 2:
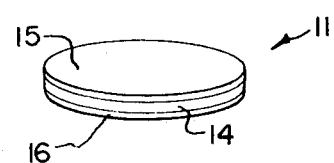

Referring now to the drawing:

In the illustrated preferred embodiment the teaching aid of the invention includes a board, shown generally at 10, and a magnet member, shown generally at 11.

Board 10 includes a central core 12 of stiff cardboard, or other suitable lightweight, rigid material. A thin layer of magnetic material 13, which may be 20 gauge sheet steel or 1 mil steel foil, or a thin layer of some other magnetically attracted metal, is placed one side of the core, and a layer of book cloth material 14 covers each side of the core and magnetic material combination. The book cloth cover, which may be proxylin impregnated, commercial standard CS57–40 book cloth, for example, is rough enough to hold chalk particles and the board therefore makes an excellent, easily erased chalk board. In addition, the magnetic material 13 provides excellent attraction for magnet members placed against the book cover material covering the foil.

The magnet member 11 is flexible and is soft enough not to mar the book cloth and is made of a piece of magnetized rubber 14, with a paint coating 15 on the top and a coating 16 of adhesively applied, slick-surfaced Mylar on the bottom. Alternatively a magnetized Mylar material having paint coating on the top and a slick-surface finish on the bottom can be used. The slick-surface coating on the magnetized members does not adversely affect their holding properties, but does allow them to more easily slide over the book cover surface which, as noted, must be rough enough to hold chalk particles.

The magnetized rubber is readily commercially available, but it will not, by itself, slide as easily as may always be desired on the book cloth cover. The use of a properly finished magnetized Mylar, which is also readily commercially available, or the addition of a slick surface Mylar coating to the magnetic members made of magnetized rubber insures a smoother surface that will more easily slide across the book cloth cover, but does not significantly affect the magnetic attraction between the magnet member and the metal foil. The paint coating provides for ready identification of individual magnet members. Naturally, any desired number and size of magnetic members and any desired color arrangement of the members can be used in conjunction with the board.

The Mylar or Mylar coated magnetized members are readily moved over the face of the board, as previously described, so a plurality of them can be used to represent team player positions, for example.

Figure 3:
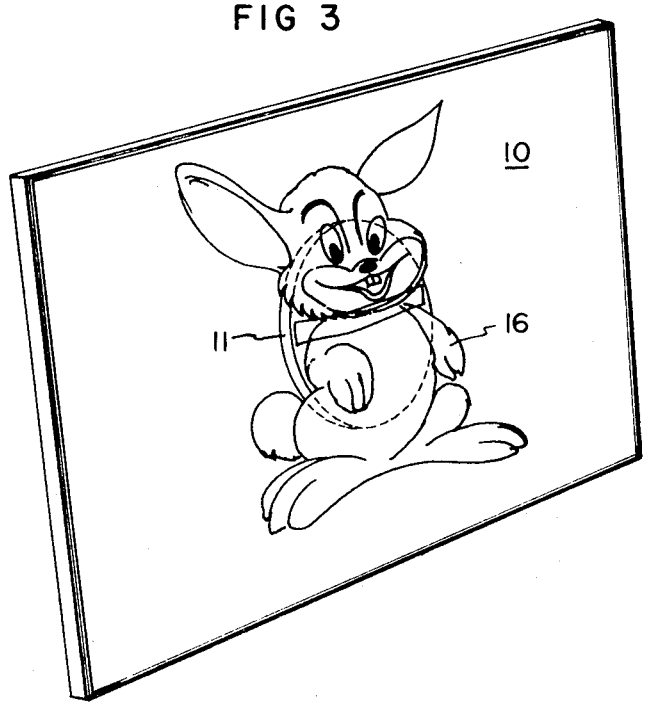

As shown in FIG. 3, characters to be placed on the board, such as that shown at 16, can be taped or otherwise affixed to a magnetic member 11 and they will then be securely magnetically held in place, but will still be movable over the face of the board with the magnetic member if it is desired to provide character animation, even with respect to semi-permanent fixed characters or designs placed on the board surface with chalk.

While a preferred embodiment of my invention has been herein described, modifications and changes are anticipated as coming within the scope of the following claims, which claims define my invention.

I claim:

1. A teaching aid comprising
   a board having a thin layer of steel foil sandwiched between layers of textured book cloth material providing covers therefor, said covers being receptive to chalk markings thereon and to erasure of such chalk markings; and
   at least one magnetized, flexible member that is magnetically attracted to the layer of steel foil, each said magnetized, flexible member having at least one face thereof coated with a material that reduces the frictional engagement between the book cloth material and the magnetized flexible member whereby said flexible member can more easily slide on the book cloth material while being magnetically held thereon.
2. A teaching aid as in claim 1, wherein
   the coating on the magnetized flexible members is slick-surfaced Mylar.

* * * * *